3,242,206
RECYCLING A PORTION OF THE REACTION PRODUCTS IN AN HNO₃ OXIDATION OF A DICARBOXY CYCLOALKENE COMPOUND TO CONTROL THE OXIDATION RATE
Ross Van Volkenburgh and Jerome R. Olechowski, both of Baton Rouge, La., assignors to Copolymer Rubber & Chemical Corporation, a corporation of Louisiana
No Drawing. Filed Dec. 18, 1961, Ser. No. 160,354
4 Claims. (Cl. 260—514)

This invention relates to the preparation of tetraoxygenated organic compounds and, in one of its more specfiic variants, to the preparation of 1,2,3,4-cyclopentanetetracraboxylic acids by an improved nitric acid oxidation process. The invention further relates to the preparation of mono- and dianhydride derivatives from the tetracarboxylic acids produced in accordance with the invention.

Nitric acid oxidation has been used heretofore for the preparation of tetracarboxylic acids. In one nitric acid oxidation process, a Diels-Alder adduct of a 1,3-butadiene and maleic anhydride is oxidized to a butane tetracarboxylic acid by addition of the adduct to fresh, relatively dilute nitric acid solution in the presence of a molybdenum or vanadium catalyst. The oxidation of the adduct has been found to take place only after an extended induction period when no apparent oxidation is taking place, which may be as long as 20 to 30 minutes, and then the oxidation may proceed very vigorously to the point of explosion. Thus, little or no control of the oxidation is possible and this has resulted in a low yield of the desired tetracarboxylic acid. The high solubility of the resultant tetracarboxylic acid product in the dilute nitric acid reaction mixture further reduces the over-all yield to a point where the prior art nitric acid oxidation processes are entirely unsatisfactory from an economic standpoint.

The present invention overcomes the above mentioned and other disadvantages of the prior art nitric acid oxidation procsses. When practicing the process of the inveniton, it has been discovered that the induction period characteristic of the prior art processes may be eliminated, and the resultant oxidation proceeds at a uniform, readily controllable rate which allows easy maintenance of optimum oxidation conditions and thereby assures high yields of desired tetraoxygenated products. Additionally, the explosion hazard present in the prior art nitric acid oxidation processes is eliminated, thereby rendering the process safe and commercially practical. It has been further discovered that the normally highly soluble tetraoxygenated products of the present invention are almost insoluble in strong nitric acid solution and are readily precipitatable therefrom upon cooling from the oxidation temperature to a lower temperature. The discovery of this unusual and entirely unexpected solubility characteristic allows the tetraoxygenated products to be precipitated in high yield from the strong nitric acid solution which is used as an oxidation medium. It has been further discovered that the process of the present invention is especially useful in the preparation of 1,2,3,4-cyclopentanetetracarboxylic acids, and especially cis,cis,cis,cis-1,2,3,4-cyclopentanetetracarboxylic acid. In practicing the preferred process of the invention for the preparation of cis,cis,cis,cis-1,2,3,4-cyclopentanetetracarboxylic acid by nitric acid oxidation of the Diels-Alder adduct of cyclopentane and maleic anhydride, it has also been discovered that the oxidation will proceed satisfactorily without adverse effect on yields in the absence of a catalyst which has always been considered to be essential heretofore. Further, that when the oxidation is carried out in the absence of a catalyst, the oxidation may be readily controlled to produce high yields of desired product without danger of an explosion.

It is an object of the present invention to provide an improved nitric acid oxidation process for preparing a tetraoxygenated organic compound.

It is a further object of the present invention to provide an improved nitric acid oxidation process for preparing 1,2,3,4-cyclopentanetetracarboxylic acids from Diels-Alder adducts of a cyclopentadiene and an ethylenically unsaturated dicarboxylic acid or its anhydride and ester derivatives.

It is still a further object of the present invention to provide an improved process for preparing cis,cis,cis,cis-1,2,3,4-cyclopentanetetracarboxylic acid by nitric acid oxidation of a Diels-Alder adduct of cyclopentadiene and maleic anhydride.

It is still a further object of the invention to provide an improved process for reducing the solubility in water of the normally water soluble tetraoxygenated organic compounds prepared by the process of the invention, and an improved process for their precipitation from an aqueous medium.

Still other objects and advantages of the invention will be apparent to those skilled in the art upon reference to the following detailed description and the examples.

It has been discovered that a Diels-Alder adduct of a diene selected from the group consisting of

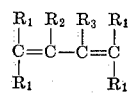

and

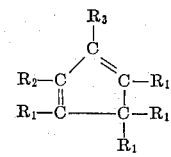

wherein $R_1$, $R_2$ and $R_3$ are monovalent substituents, and a dieneophile selected from the group consisting of monoethylenically unsaturated dicarboxylic acids having the formula

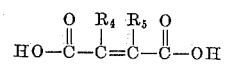

and anhydrides and esters thereof, wherein $R_4$ and $R_5$ are monovalent substituents, may be oxidized with nitric acid to produce tetraoxygenated organic compounds by an improved process in which the usual induction period is substantially reduced or eliminated. This may be accomplished by bringing the adduct into intimate contact initially with a solution containing 10–90% by weight nitric acid and comprising nitric acid solution previously used in an oxidation of the adduct and containing oxidation products resulting therefrom in an amount effective to substantially reduce the induction period. For some reason which is not fully understood at the present time, the presence of previously used or recycled nitric acid or the oxidation products contained therein results in a sharp reduction or elimination of the induction period and allows the oxidation to commence without delay and proceed at a rate which allows easy control.

The oxidation process of the present invention preferably is carried out continuously under conditions whereby the double bond of the adduct is cleaved oxidatively to produce the tetraoxygenated compound. The term "tetraoxygenated compound" is used herein to refer to oxidation products containing oxygen attached to four carbon atoms of the oxidized adduct regardless of the number of oxygen atoms present or their manner of attachment to the four carbon atoms. The normally solid adduct may be added intermittently at frequent intervals or continuously to an oxidation vessel, and nitric acid solution of the desired strength likewise is supplied to the oxidation vessel at frequent intervals or continuously. It is usually preferred that about 4–10 mols of nitric acid be present for each mol of adduct. The adduct and nitric acid solution contents of the reaction vessel may be agitated and maintained at the desired oxidation temperature, and a stream of nitric acid solution containing the oxidized adduct may be withdrawn therefrom intermittently at frequent intervals or continuously, cooled to precipitate the tetraoxygenated product, the precipitated tetraoxygenated product filtered therefrom, and at least a portion of the withdrawn nitric acid solution, preferably after recovery of product but still containing oxidation products, recycled back to the oxidation vessel. The withdrawn nitric acid solution may be fortified with concentrated nitric acid to the desired nitric acid content prior to recycle to the reaction vessel, if desired. A portion of the withdrawn nitric acid solution may be evaporated to concentrate the tetraoxygenated product, and then cooled to precipitate additional product before discarding. Normally, a sufficient volume of solution is withdrawn from the system and discarded to prevent build-up of an excessive volume of solution.

While a continuous process is usually preferred, it is possible to practice the invention by what is essentially a batchwise operation. For example, the adduct may be added incrementally or continuously to a vessel containing nitric acid solution of the proper concentration which also contains recycled or previously used nitric acid solution as described above. Additional nitric acid may be added thereto during the oxidation reaction to provide or maintain the desired level of nitric acid in the reactants. Upon completion of the oxidation, the entire reaction mixture may be cooled to precipitate the product which may be recovered by filtration, a portion of the nitric acid solution discarded for concentration and further recovery of product, and the remainder fortified with fresh concentrated nitric acid to a desired initial level and the oxidation process repeated.

Nitric acid concentrations of 10–90% by weight in aqueous, carboxylic acid, or aqueous carboxylic acid solution have been found to be satisfactory. Aqueous nitric acid is usually preferred, and the carboxylic acid when present may contain 1–4 inclusive carbon atoms with acetic acid usually giving better results. Higher recoveries of product are obtained by precipitation from the reaction mixture when the nitric acid concentration in aqueous nitric acid is about 40–45% by weight and preferably 50–65% by weight or higher, since it has been discovered unexpectedly that the normally highly soluble tetracarboxylic acid product is substantially less soluble in nitric acid solutions of this concentration. This is especially true with nitric acid concentrations of at least 55% by weight or higher, and for best results it is preferred to operate in most instances at about 60% by weight nitric acid. If desired, the nitric acid solution may contain dissolved nitrogen tetroxide. The percent by weight nitric acid in the solutions referred to herein is based on the weight of $HNO_3$ dissolved in the weight of solvent which is usually water, and other substances which may be present such as adduct or oxidation products are not included in making the calculations.

The oxidaton should be effected at a temperature not greater than about 120° C. such as 35–120° C., and preferably at about 35–80° C. when the nitric acid concentration is 40% by weight or above. Within the temperature range of 35–120° C., lower concentrations of nitric acid within the 10–90% by weight range should be selected for higher reaction temperatures, and higher concentrations of nitric acid should be selected for lower reaction temperatures. Usually, a nitric acid concentration of 45–65% by weight is preferred at temperatures within the range of 35–75° C., and temperatures of about 50–70° C. at nitric acid concentrations of about 50% to 60% $HNO_3$.

In continuous oxidation processes, better yields may be obtained at relatively short reaction times. The preferred reaction time may vary somewhat with the nitric acid concentration and the reaction temperature, but usually an average residence time in the reaction zone of about 1–30 miutes is satisfactory. Within this range, shorter reaction times are preferred for higher reaction temperatures and nitric acid concentrations, and longer reaction times at lower reaction temperatures and nitric acid concentrations. An average residence time of about 1–15 minutes may produce better results at nitric acid concentrations above 40% by weight and especially about 1–5 minutes at nitric acid concentrations of about 55–65% by weight. Immediately after withdrawal from the reaction zone or vessel, preferably the reaction mixture is quenched to terminate the oxidation by lowering the temperature rapidly or diluting with water. Upon lowering the temperature rapidly and preferably below 35° C., the product crystallizes and may be recovered by filtration. At nitric acid concentrations above about 40–45% by weight, and especially at about 50–60% by weight, it has been discovered that a further important advantage is gained in continuous operation since the tetracarboxylic acid product is much less soluble in the reaction mixture. This results in higher yields since most of the tetracarboxylic acid is recovered prior to recycle back to the oxidation step and further oxidation of the desired tetracarboxylic acid product to undesirable products or complete degradation is prevented.

In most instances it is preferred that the normally solid Diels-Alder adduct be added incrementally to the reaction mixture and preferably at about the rate of oxidation. However, this is not always necessary and it is possible for example to add the nitric acid solution directly to the adduct.

A molybdenum or vanadium-containing catalyst such as a soluble alkali molybdate or alkali vanadate, including sodium, potassium and ammonium molybdates and vanadates, may be used as a catalyst. However, unexpectedly it has been found that the reaction proceeds very satisfactorily in the absence of a catalyst in some instances, and especially when oxidizing a Diels-Alder adduct as described herein prepared from a cyclopentadiene. The oxidation of the Diels-Alder adduct of cyclopentadiene and maleic anhydride in the absence of a heavy metal catalyst proceeds very uniformly and without an induction period when practicing the present invention, and superior results may be obtained. The crude tetraoxygenated product prepared by the process of the invention has nitrogen-containing impurities present which must be removed if discoloration is to be prevented upon preparing derivatives therefrom. This is true even though the product itself may not be discolored. It has been further discovered that the nitrogen-containing impurity content may be removed by crystallization from an organic carboxylic acid containing 1–4 inclusive carbon atoms and water. For best results, the solid product should be first washed with an organic carboxylic acid containing 1–4 inclusive carbon atoms, and then the resultant washed product purified by recrystallization from a solvent mixture composed of about 80–20 parts by volume of water and about 20–80 parts by volume of the organic carboxylic acid. The resultant purified product then may be used in preparing a derivative therefrom with little or no discoloration. In stances where discoloration is not a problem, the crude product may be purified by recrystallization from water or aqueous nitric acid preferably containing at least 40–60% by weight of nitric acid.

In instances where it is desired to prepare the dianhydride of a tetracarboxylic acid prepared in accordance with the invention such as cis,cis,cis,cis-1,2,3,4,-cyclopentanetetracarboxylic acid, this may be accomplished by refluxing the tetracarboxylic acid with an organic carboxylic acid anhydride such as acetic anhydride. The resultant tetracarboxylic acid dianhydride may be recovered from the reaction mixture by cooling and filtration and dried. An alternative method of preparing an anhydride, is to dissolve the tetracarboxylic acid in a solvent, slurry the resultant solution with activated carbon, filter the carbon therefrom together with any impurity content, and then recover purified tetracarboxylic acid from the solution. The purified tetracarboxylic acid product is then heated to a temperature of 130–230° C., and preferably under vacuum to dehydrate the same and produce an anhydride, which may be the monoanhydride, the dianhydride or a mixture of mono- and dianhydrides. The dianhydride of cis,cis,cis,cis-1,2,3,4-cyclopentanetetracarboxylic acid is exceptionally useful in a number of commercial applications, such as in the preparation of esters suitable for lubricants and as a curing agent for epoxy resins.

The Diels-Alder adducts useful in practicing the present invention may be prepared by conventional practices well known to the art. The dienes useful in preparing the Diels-Alder adduct embrace those selected from the group consisting of

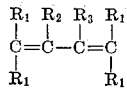

and

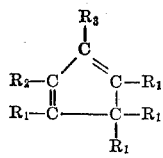

wherein $R_1$, $R_2$ and $R_3$ are any suitable monovalent substituents. While a wide variety of suitable monovalent substituents are known to the art and may be used, certain exemplary ones include hydrogen, alkyl, cycloalkyl or alkyl substituted cycloalkyl groups containing 1–20 and preferably 1–8 carbon atoms, aryl and alkylaryl groups, halogen and especially chlorine which may impart fire resistance or other desirable properties to the resultant products, and sulfur or phosphorus containing substituents such as phosphoric or sulfuric acid groups (phosphates or sulfates) which likewise may impart fire resistance. Specific examples of suitable dienes include butadiene, isoprene, piperylene, cyclopentadiene, and alkylcyclopentadienes wherein the alkyl group contains 1–8 and preferably 1–4 carbon atoms, including methylcyclopentadiene, ethylcyclopentadiene, dimethylcyclopentadiene and methylethylcyclopentadiene.

The dieneophiles which may be used in preparing the Diels-Alder adduct embrace those selected from the group consisting of monoethylenically unsaturated dicarboxylic acids having the formula

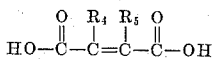

and anhydrides and esters thereof, wherein $R_4$ and $R_5$ are monovalent substituents. Esters of the dicarboxylic acid may be prepared from any suitable alcohol such as alcohols containing 1–20 and preferably 1–8 carbon atoms. In general, $R_4$ and $R_5$ may be any suitable substituents which allow preparation of satisfactory Diels-Alder adducts for use in the invention and may embrace the substituents described above for $R_1$, $R_2$ and $R_3$. Specific examples of monoethylenically unsaturated dicarboxylic acids satisfactory for practicing the invention include fumaric acid and maleic acid, and their ester, anhydride and chloro- or dichloro-derivatives Preferred results are obtained when $R_1$ through $R_5$ are certain substituents, and especially when a desired end product is to be produced. For example, when preparing a tetracarboxylic acid it is desirable that $R_2$ and $R_3$ be hydrogen since the tetracarboxylic acid is produced upon oxidative cleavage of the double bond between the carbon atoms to which the hydrogen is attached. However, in instances where $R_2$ and $R_3$ are alkyl or cycloalkyl, it is possible to form a keto acid or diketo acid which upon further oxidation produces the tetracarboxylic acid. Preferably, the Diels-Alder adduct is prepared from maleic anhydride and cyclopentadiene in instances where it is desired to produce 1,2,3,4-cyclopentanetetracarboxylic acid. This specific tetracarboxylic acid has been found to have many unusual properties.

The material to be oxidized in accordance with the invention include compounds having the following structural formulae:

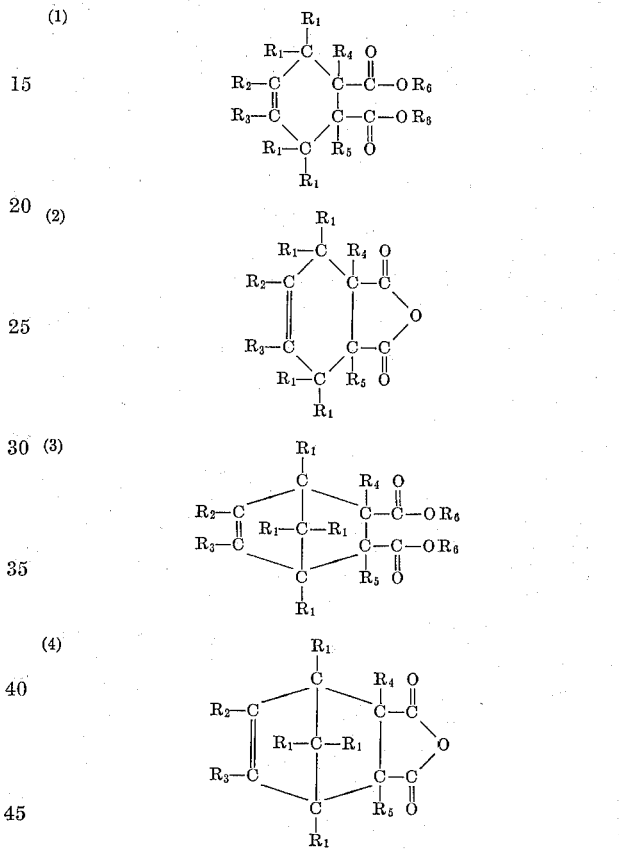

wherein $R_1$ through $R_5$ are monovalent substituents as discussed above for the dienes and dieneophiles and $R_6$ is hydrogen or an alcoholic residue derived, for example, by reacting in alcohol containing 1–20 and preferably 1–8 carbon atoms with the dibasic acid. Such compounds may be conveniently prepared by subjecting the dienes and dieneophiles mentioned herein to a Diels-Alder reaction. However, other methods of preparation may be used and the Diels-Alder adducts recited in the specification and claims are intended to encompass compounds of the above formulae. The carbon-carbon double bond in each formula is attacked upon nitric acid oxidation in accordance with the invention thereby resulting in oxygen being attached directly to the two carbon atoms. When it is desired to prepare a tetracarboxylic acid preferably $R_2$ and $R_3$ are hydrogen and the double bond is cleaned on nitric acid oxidation to form two carboxylic groups. When $R_2$ and $R_3$ are organic radicals, the keto- groups formed initially on nitric acid oxidation and cleavage of the double bond are further oxidized to form carboxylic groups. The ester or anhydride linkages when present may be hydrolyzed to form two additional free carboxylic groups and thus result in preparation of the desired tetracarboxylic acid.

The foregoing detailed description and the following specific example are for purposes of illustration only, and are not intended as being limited to the spirit or scope of the appended claims.

Example 100 grams (0.61 mol) of the Diels-Alder adduct of cyclopentadiene and maleic anhydride (bicyclo[2.2.1]-hept-5-en-2,3-dicarboxylic anhydride) was added incrementally over a two hour period to 189 grams of aqueous nitric acid containing 60% by weight $HNO_3$. No heavy metal catalyst was present. The temperature of the resultant reaction mixture was maintained at 60° C., and periodic additions of 90% $HNO_3$ were used to maintain the concentration of the nitric acid solution at 60% $HNO_3$. The reaction mixture was stirred over the two hour period of addition, and then stirred for an additional one and one-half hours while maintaining the temperature at 60° C. Thereafter, the reaction mixture was cooled and the resultant precipitated cis,cis,cis,cis-1,2,3,4-cyclopentane-tetracarboxylic acid was removed by filtration. The filtrate was fortified with 90° $HNO_3$ to the original 60% $HNO_3$ level, and the oxidation cycle was repeated using another 100 gram portion of the adduct and following the same procedure.

In the first oxidation cycle, an induction period of approximately 20 minutes was noted before the reaction began. This induction period was not present in later cycles where the nitric acid solution contained recycled nitric acid. The melting point of the product was 194–195° C. and the yield was about 80–85° of the theoretical based on the adduct.

The above procedure for the first oxidation cycle was modified by adding all of the adduct to fresh nitric acid (no recycle acid present) in the presence of 0.25% of an ammonium vanadate catalyst and at a temperature of 40° C. It was impossible to control the reaction and an explosion resulted which destroyed the reaction vessel.

Use of 0.25% of an ammonium vanadate catalyst in the procedure of the second oxidation cycle did not increase the yield of product.

What is claimed is:
1. In a process for oxidizing with 10–90% by weight aqueous nitric acid a compound selected from the group consisting of:

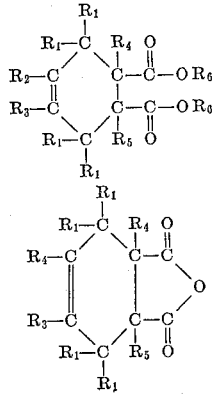

and

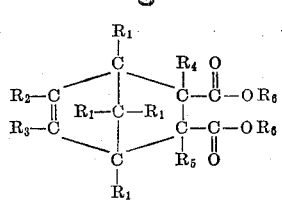

wherein $R_1$ through $R_5$ are monovalent substituents selected from the group consisting of hydrogen, aryl groups, alkyl groups and cycloalkyl groups containing 1–20 carbon atoms, and $R_6$ is a monovalent substituent selected from the group consisting of hydrogen and alkyl groups containing 1–20 carbon atoms, the improvement which comprises recycling a portion of the reaction product to avoid an explosive reaction rate and substantially reduce the induction period.

2. The process of claim 1 wherein the aqueous nitric acid solution contains at least 40% by weight of nitric acid.

3. The process of claim 1 wherein the said compound is oxidized in the presence of a catalyst selected from the group consisting of sodium molybdate, potassium molybdate, ammonium molybdate, sodium vanadate, potassium vanadate and ammonium vanadate.

4. The process of claim 1 wherein said compound is the anhydride of bicyclo-(2.2.1)-hept-5-ene-2,3-dicarboxylic acid.

References Cited by the Examiner

FOREIGN PATENTS

| | | |
|---|---|---|
| 446,902 | 2/1948 | Canada. |
| 510,638 | 8/1939 | Great Britain. |
| 823,840 | 11/1959 | Great Britain. |
| 855,564 | 12/1960 | Great Britain. |

OTHER REFERENCES

Alder et al.: "Liebig's Annalen der Chemie," vol. 611 (1958), pp. 7–32.

Weissberger: "Technique of Organic Chemistry," vol. VIII, page 423.

LORRAINE A. WEINBERGER, *Primary Examiner.*

CHARLES B. PARKER, *Examiner.*